(12) United States Patent
Pinto et al.

(10) Patent No.: US 11,686,360 B2
(45) Date of Patent: Jun. 27, 2023

(54) LOCK NUT

(71) Applicant: Foundation Brakes France SAS, Drancy (FR)

(72) Inventors: Rosa Pinto, Champigny-sur-Marne (FR); Jèrôme Bertrand, Romainville (FR); Fabrice Umbdenstock, Paris (FR); Philippe Bourlon, Dammartin en Goële (FR)

(73) Assignee: Foundation Brakes France SAS, Drancy (FR)

( * ) Notice: Subject to any disclaimer, the term of this patent is extended or adjusted under 35 U.S.C. 154(b) by 79 days.

(21) Appl. No.: 16/982,921

(22) PCT Filed: Mar. 27, 2019

(86) PCT No.: PCT/EP2019/057799
§ 371 (c)(1),
(2) Date: Sep. 21, 2020

(87) PCT Pub. No.: WO2019/185759
PCT Pub. Date: Oct. 3, 2019

(65) Prior Publication Data
US 2021/0010553 A1    Jan. 14, 2021

(30) Foreign Application Priority Data
Mar. 28, 2018    (FR) ...................................... 1852707

(51) Int. Cl.
*F16D 55/16*    (2006.01)
*F16D 65/18*    (2006.01)
(Continued)

(52) U.S. Cl.
CPC ........... *F16D 65/18* (2013.01); *F16D 55/226* (2013.01); *F16D 65/567* (2013.01);
(Continued)

(58) Field of Classification Search
CPC ...... F16D 65/18; F16D 55/226; F16D 65/567; F16D 2055/0016; F16D 2125/06; F16D 2125/40
See application file for complete search history.

(56) References Cited

U.S. PATENT DOCUMENTS

2014/0158480 A1\* 6/2014 Qian ...................... B60T 1/065
188/72.8

FOREIGN PATENT DOCUMENTS

| CN | 205154857 U | 4/2016 |
|---|---|---|
| CN | 107489714 A | 12/2017 |

(Continued)

OTHER PUBLICATIONS

Machine translation of KR 20130058263 (no date).\*
(Continued)

*Primary Examiner* — Nicholas J Lane
(74) *Attorney, Agent, or Firm* — M&B IP Analysts, LLC.

(57) ABSTRACT

A longitudinal end of the nut has:
  at least one blocking face forming a means for blocking a rotation of the nut along a longitudinal axis of the nut, and
  at least one transmission face forming a means for transmitting a force directed along the axis.
The blocking face or at least one of the blocking faces and the transmission face or at least one of the transmission faces have at least one common edge, and the blocking face or at least one of the blocking faces is concave.

10 Claims, 2 Drawing Sheets

(51) Int. Cl.
*F16D 55/226* (2006.01)
*F16D 65/56* (2006.01)
*F16D 55/00* (2006.01)
*F16D 125/06* (2012.01)
*F16D 125/40* (2012.01)

(52) U.S. Cl.
CPC .. *F16D 2055/0016* (2013.01); *F16D 2125/06* (2013.01); *F16D 2125/40* (2013.01)

(56) References Cited

FOREIGN PATENT DOCUMENTS

| FR | 2496784 A1 | 6/1982 | | |
|---|---|---|---|---|
| FR | 3050493 B1 | 10/2017 | | |
| JP | 2015537175 A | 12/2015 | | |
| KR | 20130058263 A | * | 6/2013 | ........... F16D 55/226 |
| KR | 1020160053631 A | * | 5/2016 | ............. F16D 55/26 |
| KR | 2017082276 A | * | 7/2017 | ............. F16D 65/14 |

OTHER PUBLICATIONS

Machine translation of KR 2017082276 (no date).*
Machine translation of KR 1020160053631 (no date).*
The International Search Report and The Written Opinion for PCT/EP2019/057799 of the International Searching Authority, dated Jun. 7, 2019, ISR/EPO, Rijswijk, The Netherlands.
The First Chinese Office Action for Chinese Application No. 201980021827.1, dated: Jul. 23, 2021, The State ntellectual Property Office of People's Republic of China, Beijing City, China.
Japanese Office Action for application JP 2020-552016, dated Feb. 7, 2023. Japan Patent Office, Tokyo, Japan.

* cited by examiner

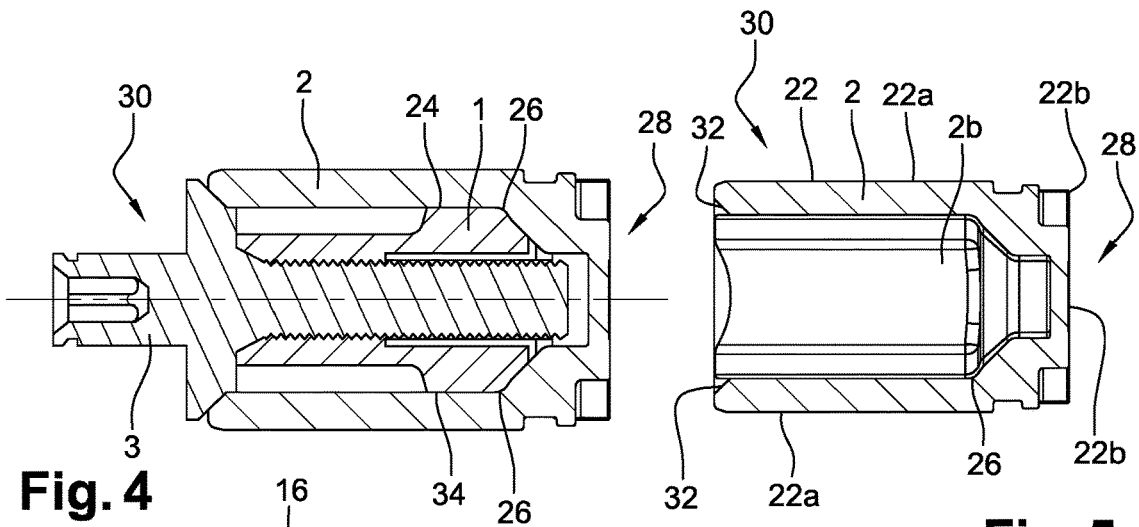
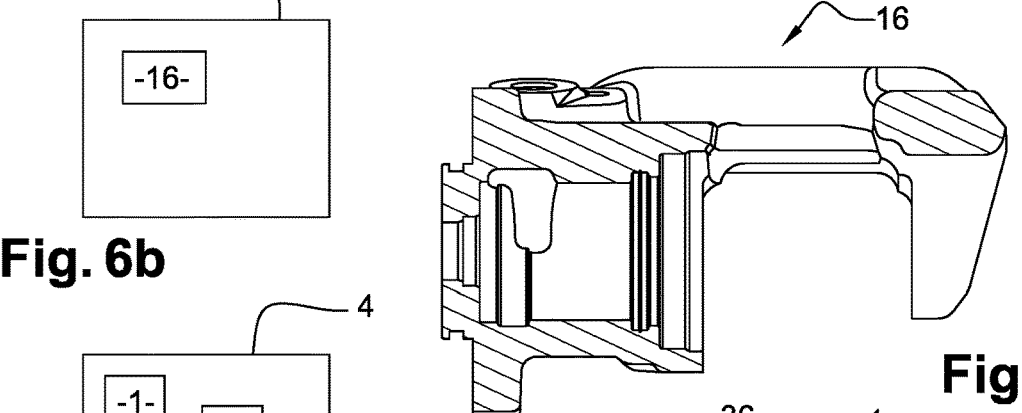
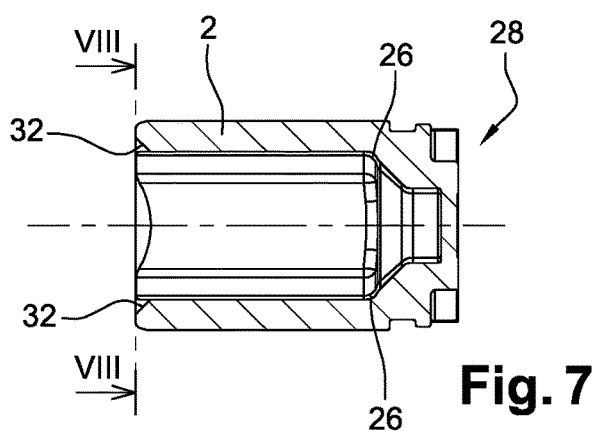
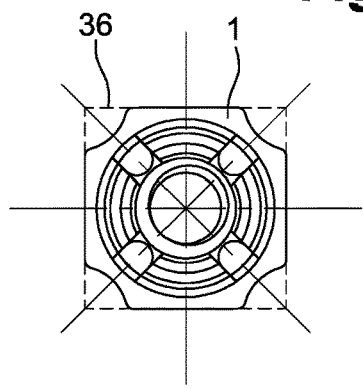

LOCK NUT

CROSS-REFERENCE TO RELATED APPLICATIONS

This application claims priority under 35 U.S.C. § 371 to the International Application No. PCT/EP2019/057799, filed Mar. 27, 2019, and to the French Application No. 1852707, filed Mar. 28, 2018, the contents of which are hereby incorporated by reference.

FIELD OF THE INVENTION

The invention relates to nuts, for example brake caliper nuts intended to be fitted on braking systems.

BACKGROUND OF THE INVENTION

A nut is an elementary component of a screw/nut system intended for the assembly of parts or the conversion of movement. It can be used to convert a rotational movement into a linear movement by forming a screw-nut system. For example, a nut of a vehicle wheel brake caliper converts the rotational movement of a screw into a linear movement, transmitted to a piston which pushes a brake pad. The nut is therefore often housed inside the piston and must be connected thereto.

A nut already provided with means for blocking the rotation along the longitudinal axis of the nut in the form of a collar has already been proposed. However, such collars increase the piston volume. In addition, if the nut geometry is modified, the screw and the piston also often need to be modified.

OBJECT AND SUMMARY OF THE INVENTION

The invention aims to overcome these disadvantages by providing a nut in which the longitudinal end of the nut has:
- at least one blocking face forming a means for blocking a rotation of the nut along a longitudinal axis of the nut, and
- at least one transmission face forming a means for transmitting a force directed along the axis, the blocking face or at least one of the blocking faces and the transmission face or at least one of the transmission faces having at least one common edge, and the blocking face or at least one of the blocking faces being concave.

The space between the blocking means and the transmission means is therefore eliminated. The nut is therefore thinner, which saves space and material.

Advantageously, the transmission face or at least one of the transmission faces comprises a spherical part.

Such a shape allows a better distribution of the linear movement transmission forces.

At least one groove could cross the blocking face, or at least one of the blocking faces, and the transmission face, or at least one of the transmission faces.

Such a groove allows the brake fluid to flow between the piston and the nut.

Preferably, the groove is curved along its length.

Advantageously, the groove opens out onto a longitudinal orifice of the nut.

The groove could also form a bearing surface perpendicular to the axis.

Such bearing surfaces make the nut easier to machine.

Advantageously, the bearing surface has at least one curved edge.

The nut could comprise several grooves, preferably identical to each other.

Advantageously, there are four grooves arranged in a cross pattern in a plane perpendicular to the longitudinal axis.

Another longitudinal end of the nut could have at least one other blocking face forming at least one other means for blocking the rotation of the nut along the longitudinal axis.

The forces blocking the rotation can therefore be distributed on the piston along the body of the nut.

The nut could be 20 to 50 mm long, preferably 30 to 40 mm long, more preferably 33 to 37 mm long, and even more preferably 35.5 to 36.1 mm long.

Similarly, the nut could have an outer diameter of 15 to 35 mm, preferably 20 to 30 mm, more preferably 22 to 28 mm, and even more preferably 25 to 27 mm.

One side of an outer square of the nut could be 12 to 32 mm long, preferably 20 to 25 mm long, more preferably 22 to 24 mm long, and even more preferably 22.9 to 23.2 mm long.

The nut could have an inner diameter of 9 to 23 mm, preferably 12 to 18 mm, more preferably 15 to 17 mm, and even more preferably 16 to 16.5 mm.

A brake caliper comprising a nut according to the invention is also provided.

Advantageously, the brake caliper comprises a piston and a screw.

A braking device comprising a brake caliper according to the invention is also provided.

BRIEF DESCRIPTION OF THE DRAWINGS

We will now describe one embodiment of the invention given as a non-limiting example referring to the attached figures, on which:

FIG. 4 is a cross-sectional view of the nut, a screw and a piston according to the invention, FIG. 5 is a transverse view of a piston according to the invention, FIG. 6a is a transverse view of a brake caliper according to the invention.

FIG. 6b is a diagram of the brake caliper comprising a nut, a screw and a piston according to the invention, FIG. 6c is a diagram of a braking device according to the invention comprising the brake caliper, FIG. 7 is a cross-sectional view of the piston, and FIG. 8 is a transverse view of the piston along the plane VII-VII of FIG. 7.

FIG. 9 is a front view of the nut.

MORE DETAILED DESCRIPTION

Figure 1:
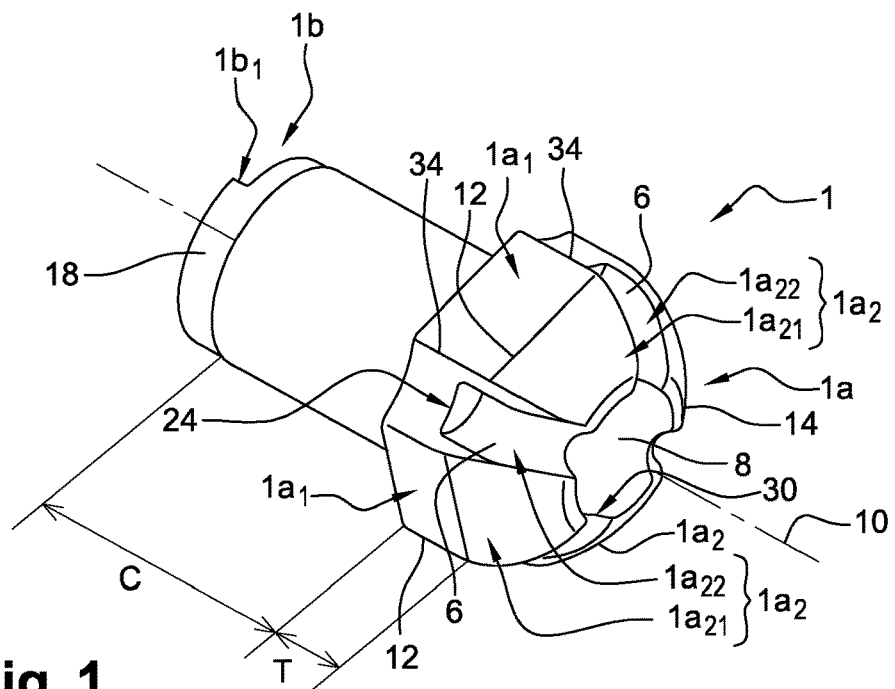
FIG. 1 is a perspective view of a nut according to the invention.
Figure 2:
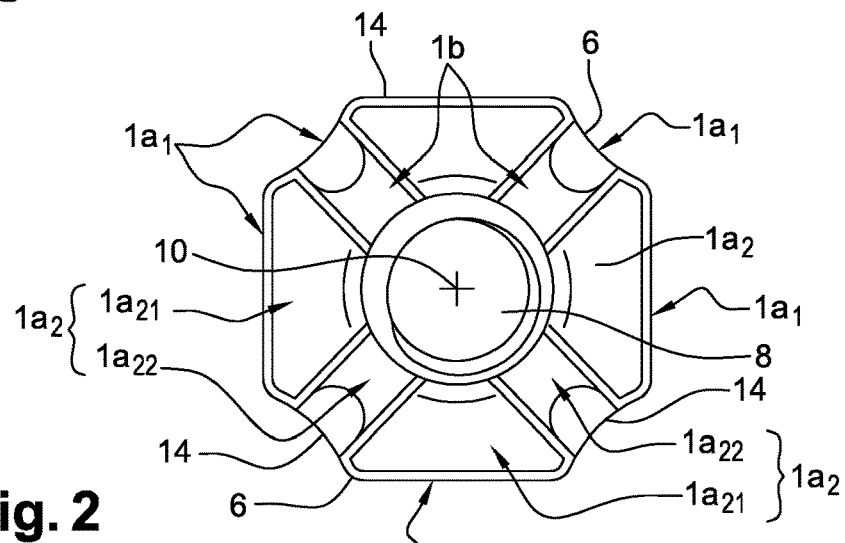
FIG. 2 is a front view of the nut.
Figure 3:
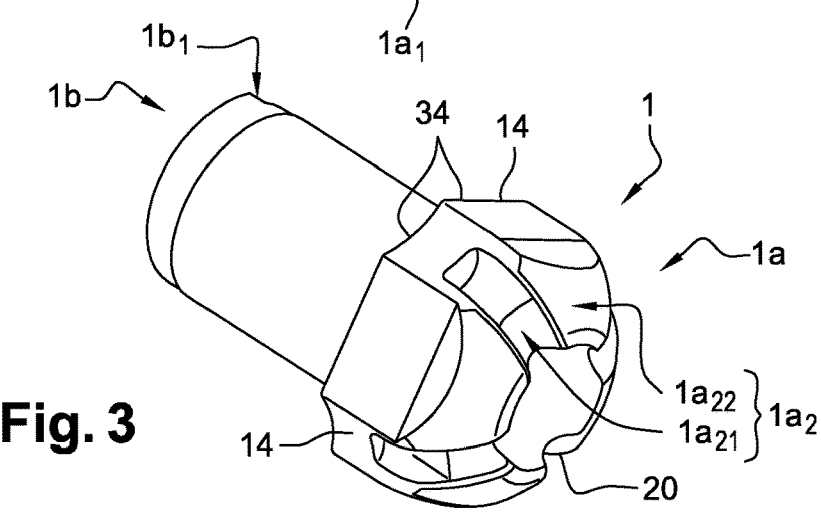
FIG. 3 is another perspective view of the nut.

As shown on FIGS. 1 and 3, the nut 1 comprises two parts: a body C on most of its length and an end head T. The body has an external face having the shape of a straight circular cylinder of longitudinal axis 10. As shown on FIG. 2, the nut is provided with an internal duct 8 opening out at each end 1a and 1b. It is therefore hollow. The duct also has the shape of a straight circular cylinder of longitudinal axis 10.

The end head T comprises several lateral faces $1a_1$ and several extremal faces $1a_2$.

The lateral faces $1a_1$ form an octagon around the axis 10. They can be flat, concave or convex. In this case, half of the faces $1a_1$ are flat and the other half are concave according to an alternate arrangement between the flat faces and the concave faces.

The extremal faces $1a_2$ form a pyramid with spherical faces of truncated octagonal base of height equal to the longitudinal axis 10. In other words, the extremal faces are partially spherical since they are part of a spherical cap. A spherical cap is in fact a spherical surface formed by the intersection of a sphere and a plane. In this case, the spherical cap forming the extremal faces $1a_2$ is formed by the intersection of a sphere whose centre belongs to the axis 10 and the plane containing the edges 12.

The extremal faces $1a_2$ are divided into two groups: a first group $1a_{21}$ and a second group $1a_{22}$. The set of extremal faces $1a_2$ is partially spherical, however the extremal faces $1a_2$ may be concave or convex. In this case, the faces $1a_{21}$ of the first group are concave and the faces $1a_{22}$ of the second group are convex. In the embodiment shown on FIGS. 1 to 3, half of the extremal faces are convex and the other half are concave according to an alternate arrangement between the convex faces and the concave faces. Thus, the faces $1a_{22}$ are hollow unlike the faces $1a_{21}$ which are in relief.

As shown on FIG. 1, the lateral and extremal faces have a common edge 12. In other words, the extremal $1a_2$ and lateral $1a_1$ faces are adjacent or contiguous. In addition, the flat lateral faces have an edge in common with the convex extremal faces while the concave lateral faces have an edge in common with the concave lateral faces.

The end head T is provided with several grooves 6. The grooves 6 open out onto the orifice forming the end of the duct 8 and each form a bearing surface 14 perpendicular to the axis 10. The grooves 6 are directed longitudinally along a first radius of longitudinal curvature. A radius of curvature of a curve is the radius of the curve osculating circle, also called the circle of curvature. This means that the radius of curvature is the radius of a circle following the curve as closely as possible. In this case, the radius of longitudinal curvature of the groove 6 has the same centre as the radius of curvature of the spherical cap. In addition, this radius is contained in the axis 10. In other words, the circle of curvature of the spherical cap and that of the longitudinal curvature of the groove are homothetic: one is the image of the other according to a homothety having a centre belonging to the axis 10. Furthermore, the grooves 6 are also directed longitudinally along a second radius of lateral curvature.

The number of grooves 6 is arbitrary. In this case, the end head T of the nut comprises four grooves, all identical to each other and arranged in a cross pattern as shown on FIG. 2. Similarly, the radii of longitudinal curvature and the radii of lateral curvature are chosen depending on the circumstances. For example, the grooves 6 may each have identical radii of longitudinal curvature and different radii of lateral curvature, or vice versa. All the radii of curvature may also be identical from one groove to another, whether for the longitudinal curvatures or the lateral curvatures of the grooves 6. Furthermore, the radius of lateral or longitudinal curvature of a groove 6 may also vary along its length.

In this case, the grooves 6 are located on the convex faces $1a_{22}$. In other words, the faces $1a_{22}$ comprise the grooves 6, however, the grooves could be arranged on the concave faces $1a_{21}$. The grooves can be arranged according to other patterns: for example, they may be arranged according to the vertices of a regular polygon. Lastly, the curve defined by the points of the groove 6 having the smallest radial radius with respect to the axis 10 is a straight line according to this embodiment. This curve defines the path of the groove. Its geometry is generally arbitrary.

The other end $1b$ of the nut 1 comprises a notch 18 in the body C of the nut. The notch has a main face $1b$ extending in a plane radial to the axis 10.

The nut comprises a thread on the internal face 20 of the duct 8.

As shown on FIG. 4, the nut is intended to receive a screw 3 in the duct 8. In addition, the nut 1 is intended to be inserted in a piston 2. The piston 2 is provided with a longitudinal internal duct 22 and, at one end, longitudinal $22a$ and extremal $22b$ internal faces having a common edge 26. The piston duct 22 is cylindrical with a circular cross-section. As shown on FIG. 5, the orifice has a frustoconical shape at the closed end 28 of the piston, located on the right on FIGS. 4 and 5. As shown on FIGS. 5 and 6, the edge of the piston forming the entry of the orifice 22 is provided with an internal chamfer 32 at the other end 30. The screw 3 comprises an external thread adapted to cooperate with the internal thread of the nut 1. It comprises a frustoconical screw head of which an angle at the top of a head generation cone is equal to the angle of inclination of the internal chamfer of the edge of the piston.

As shown on FIG. 4, the screw 3, the nut 1 and the piston 2 are arranged so that the common edge 12 of the lateral $1a_1$ and extremal $1a_2$ lateral faces is opposite the common edge 26 of the faces $22a$ and $22b$ of the piston. Thus, the extremal faces $1a_2$ of the nut 1 provide a sphere/cone support between the nut 1 and the piston 2.

In addition, the internal chamfer 32 of the edge of the piston is opposite the screw head 2 since the angles of inclination of the chamfer and of the truncated cone of the screw head are equal.

According to the invention, a brake caliper 16 shown on FIG. 6a receives the screw 3, the nut 1 and the piston 2 in the same configuration as on FIG. 4.

According to the invention, a braking device 4 shown on FIG. 6c comprises the brake caliper 16.

We will now describe the operation of such a nut.

Once the nut 1 is inserted in the piston 2 as shown on FIG. 4, the common edges 34 of the lateral faces $1a_1$ prevent the rotation of the nut 1 about the axis 10 relative to the piston 2. The lateral faces form a means of blocking the rotation of the nut 1 about the axis 10. The lateral faces $1a_1$ are therefore blocking faces. This blocking connects the piston 2 and the nut 1 together.

Thus, the rotation of the screw 3 relative to the caliper moves the nut 1 due to the shape complementarity between the external thread of the screw 3 and the internal thread of the nut 1. Since the nut 1 is connected to the piston 2, its translation causes the translation of the piston 2 by means of the extremal faces $1a_2$. The extremal faces $1a_2$ therefore form means for transmitting a linear force along the axis 10. This force transmission allows the transmission of a linear movement along the axis 10: the linear movement of the nut 1 along the axis 10 causes the linear movement of the piston 2 along the axis 10.

The grooves 6 form passages. They therefore favor the flow of brake fluid inside the piston.

We will now describe the advantages provided by the nut 1.

Since the transmission faces $1a_2$ and the blocking faces $1a_1$ have a common edge 12, the nut is smaller. For example, an outer diameter of the square of the nut is 26.05 mm instead of 29.65 mm. A length of an outer square 36, shown on FIG. 9, of the nut is 23.05 mm (variation of 0.15 mm) instead of 26.65 mm (variation of 0.15 mm). The outer square is defined as being the square formed by the intersection, in a plane orthogonal to the axis 10, of straight lines tangential to the flat faces $1a_1$, as shown on FIG. 9.

Such a nut therefore adapts to pistons of smaller dimensions. For example, a diameter of the bearing area between the means for blocking the rotation of the nut 1, in this case the lateral faces $1a1$, and the piston 2 is 26 mm instead of 28 mm. Due to this space saving, the inner diameter of the piston square is 28.5 mm (possible variation of 0.2 mm) instead of 32.1 mm (same variation). Similarly, the diameter of the nut/piston bearing cone is 16.2 mm instead of 19.8 mm. Lastly, the diameter of the nut sphere formed by the extremal faces $1a_2$ is 16.2 mm instead of 19.8 mm.

Such a nut can be used with a smaller screw and piston without having to modify their geometries.

The nut is easier to machine. Since there is no collar, the number of manufacturing steps is reduced. In addition, the bearing areas 14 formed by the grooves make the nut easier to machine since they cooperate more easily with machining claws. Lastly, they allow manufacture using a stamping method.

The invention is not limited to the embodiments described and other embodiments will be clearly apparent to those skilled in the art.

1—nut
1a—end of the nut
$1a_1$—lateral faces of the end head of the nut
$1a_2$—extremal faces of the end head of the nut
$1a_{21}$—concave extremal faces
$1a_{22}$—convex extremal faces
1b—other end of the nut
$1b_1$—face of the notch at the other end of the nut
2—piston
3—screw
4—braking device
6—groove
8—longitudinal orifice of the nut
10—longitudinal axis of the nut
12—common edge of the lateral and extremal faces of the nut
14—bearing area
16—brake caliper
18—notch
20—face of the internal orifice of the nut
22—longitudinal orifice of the piston
22a—longitudinal faces of the longitudinal orifice of the piston
22b—extremal faces of the longitudinal orifice of the piston
24—contour of the bearing area
26—common edge of the longitudinal and extremal faces of the piston
28—closed end of the piston
30—open end of the piston
32—internal chamfer of the edge of the piston
34—common edge of the lateral faces of the end head of the nut
36—outer square of the nut
C—body of the nut
T—end head of the nut

What is claimed is:

1. Nut, wherein one longitudinal end of the nut has:
at least one blocking face forming a means for blocking a rotation of the nut along a longitudinal axis of the nut, and
at least one transmission face forming a means for transmitting a force directed along the axis,
the at least one blocking face and the at least one transmission face having at least one common edge, and
the at least one blocking face being concave,
the nut comprising at least one groove crossing the at least one blocking face, wherein the at least one groove opens out onto a longitudinal orifice of the nut, wherein the at least one groove forms a bearing surface perpendicular to the axis.

2. Nut according to claim 1, wherein the groove is curved along its length.

3. Nut according to claim 1, wherein a contour of the bearing surface has at least one curved edge.

4. Nut according to claim 1 comprising several grooves, identical to each other.

5. Nut according to claim 4, wherein there are four grooves arranged in a cross pattern in a plane perpendicular to the axis.

6. Nut according to claim 1, wherein another longitudinal end of the nut has at least one other blocking face forming at least one other means for blocking the rotation of the nut with respect to a screw along the longitudinal axis.

7. Brake caliper comprising a nut according to claim 1.

8. Brake caliper according to claim 7 comprising:
a piston,
a screw, and the screw crossing the nut and the nut being inserted in the piston.

9. Braking device comprising a brake caliper according to claim 7.

10. Nut, wherein one longitudinal end of the nut has:
at least one blocking face forming a means for blocking a rotation of the nut along a longitudinal axis of the nut, and
at least one transmission face forming a means for transmitting a force directed along the axis,
the at least one blocking face and the at least one transmission face having at least one common edge, and
the at least one blocking face being concave,
the nut comprising at least one groove crossing the at least one blocking face, wherein the at least one groove opens out onto a longitudinal orifice of the nut, wherein the at least one groove forms a bearing surface perpendicular to the axis,
the at least one transmission face comprising a spherical part.

* * * * *